(12) United States Patent
Barbieri (10) Patent No.: US 9,371,130 B1
(45) Date of Patent: Jun. 21, 2016

(54) COLLAPSIBLE WING AND UNMANNED AIRCRAFT SYSTEMS INCLUDING COLLAPSIBLE WING

(71) Applicant: CAWTU, LLC, Clayton, MO (US)

(72) Inventor: James Emmett Dee Barbieri, Richmond Heights, MO (US)

(73) Assignee: CAWTU LLC, St. Louis, MO (US)

( * ) Notice: Subject to any disclaimer, the term of this patent is extended or adjusted under 35 U.S.C. 154(b) by 0 days.

(21) Appl. No.: 14/686,052

(22) Filed: Apr. 14, 2015

Related U.S. Application Data

(62) Division of application No. 13/463,516, filed on May 3, 2012, now Pat. No. 9,010,693.

(60) Provisional application No. 61/482,079, filed on May 3, 2011.

(51) Int. Cl.
*B64C 3/56* (2006.01)
*B64C 3/54* (2006.01)
*B64C 39/02* (2006.01)

(52) U.S. Cl.
CPC ... *B64C 3/54* (2013.01); *B64C 3/56* (2013.01); *B64C 39/024* (2013.01); *B64C 2201/021* (2013.01); *B64C 2201/102* (2013.01); *B64C 2201/203* (2013.01); *Y02T 50/145* (2013.01)

(58) Field of Classification Search
CPC ...... B64C 2201/203; B64C 3/54; B64C 3/56; B64C 2201/102
See application file for complete search history.

(56) References Cited

U.S. PATENT DOCUMENTS

| | | | |
|---|---|---|---|
| 2,038,337 A | 4/1936 | Ballmann | |
| 3,902,944 A | 9/1975 | Ashton et al. | |
| 7,789,343 B2 | 9/2010 | Sarh et al. | |
| 7,832,690 B1 | 11/2010 | Levine et al. | |
| 7,866,610 B2 * | 1/2011 | Bousfield | B64C 3/18 244/218 |
| 2011/0001016 A1 | 1/2011 | Skillen et al. | |

* cited by examiner

*Primary Examiner* — Brian M O'Hara
*Assistant Examiner* — Michael Kreiner
(74) *Attorney, Agent, or Firm* — Armstrong Teasdale LLP (57) ABSTRACT

A collapsible wing, methods of producing the collapsible wing, and an unmanned aircraft system that includes the collapsible wing are provided.

24 Claims, 7 Drawing Sheets

COLLAPSIBLE WING AND UNMANNED AIRCRAFT SYSTEMS INCLUDING COLLAPSIBLE WING

CROSS REFERENCE TO RELATED APPLICATION

This application is a divisional of prior U.S. application Ser. No. 13/463,516, filed May 3, 2012, which is hereby incorporated by reference herein in its entirety. Prior U.S. application Ser. No. 13/463,516 claims the benefit of U.S. Provisional Application No. 61/482,079, filed on May 3, 2011, which is hereby incorporated by reference herein in its entirety.

FIELD OF THE INVENTION

This application relates to a collapsible wing, methods of producing the collapsible wing, and an unmanned aircraft system that includes a collapsible wing.

BACKGROUND OF THE INVENTION

In modern-day military operations, unmanned aircraft systems (UAS) may be carried by front-line soldiers for use as a quick source of intelligence as needed. In those areas of interest which are too dangerous for humans to investigate first-hand, a UAS may be assembled and launched to observe the area of conflict using an array of intelligence, surveillance, and reconnaissance (ISR) sensors carried by the UAS airframe. Imaging sensors may typically include electro-optic (EO), infrared (IR), and synthetic aperture radar (SAR). Emerging uses of UAS may include integrated signals intelligence (SIGINT), electronic warfare (EW), cyber warfare, data relay, and attack capabilities. Existing UAS airframes are typically radio-controlled aircraft with varying levels of autonomous flight capabilities. Small class UAS may typically have wingspans ranging between about four and about five feet.

Mobility and ease of use are somewhat limited for existing UAS. Existing UAS are typically transported in a disassembled state with the wing detached from the fuselage of the aircraft. Transporting an existing UAS aircraft in the field typically entails carrying multiple boxes that are the full size of the wing, and may require two or more personnel to move. Further, the assembly of some existing UAS aircraft may be accomplished with tools that may be difficult to operate in limited visibility conditions or by soldiers wearing protective gear such as gas masks or gloves.

The limited mobility and difficulty of assembly in certain conditions may hamper the effectiveness of UAS by front-line soldiers in combat situations. The bulky crates may hamper the mobility of the soldiers and limit the front-line scenarios in which an UAS may be used. If the assembly of the UAS in the field requires an inordinate amount of time to unpack, assemble, and/or deploy, the resulting delay in obtaining critical intelligence may squander a window of opportunity to complete a mission or potentially endanger the lives of personnel.

In addition, the role of UAS technology is expanding to encompass a wide variety of operational scenarios including law enforcement, border patrol, search and rescue, mapping, meteorology and other scientific research, as well as recreational uses. At present, the U.S. Federal Aviation Administration (FAA) is considering the release of formal regulations related to the operation of small, unmanned air vehicles (UAVs) within U.S. airspace. Given the proliferation of these UAVs, there exists a need for a fundamental improvement of their design to increase portability, usability, and practicality.

A need exists in the art for a UAS with enhanced mobility and ease of assembly. In particular, a need in the art exists for a UAS that may be transported in a container small enough to be easily carried by an individual operator. Further, a need in the art exists for an easily transported UAS that may be assembled quickly in low visibility and time-sensitive conditions without the use of tools or extensive training. Such a UAS may facilitate the continued adoption of UAS by a larger number of users in a wider variety of scenarios.

SUMMARY OF INVENTION

In an aspect, a collapsible wing for an unmanned aircraft system is provided that includes a central section attachable to a fuselage of the unmanned aircraft system and a plurality of monocoque wing sections. The plurality of wing sections may include at least two left wing sections that include a left wing root section and a left wing span section. The left wing span section may nest within the left wing root section and the left wing root section may nest within the central section when the wing is in a collapsed configuration. The plurality of wing sections may further include at least two right wing sections that include a right wing root section and a right wing span section. The right wing span section may nest within the right wing root section and the right wing root section may nest within the central section opposite to the left wing root section when the wing is in the collapsed configuration. The wing may be configured to be deployed between the collapsed configuration and an extended configuration. The extended configuration may include: at least a portion of the left wing span section protruding from within the left wing root section; at least a portion of the left wing root section protruding from within the central section; at least a portion of the right wing span section protruding from within the right wing root section; and at least a portion of the right wing root section protruding from within the central section. The plurality of wing sections may further include any one or more of: metals, metal alloys, plastics, woods, composite materials, and any combination thereof. The plurality of wing sections may be strutless. The central section may further include an attachment fitting configured to engage a corresponding receptacle formed in a fuselage of the unmanned aircraft system In another aspect, a collapsible wing for an unmanned aircraft system is provided that includes at least two monocoque wing sections. The at least two monocoque wing sections may include a wing root section and a wing span section. The wing may be configured to deploy between a collapsed configuration and an extended configuration. The wing span section may be nested within a lumen of the wing root section in the collapsed configuration. At least a portion of the wing span section may protrude from within the lumen of the wing root section in the extended configuration. The wing may further include at least one overlap region when the wing is in the extended configuration. Each overlap region may include a nested portion of a protruding wing section remaining within the lumen of an adjacent wing section with a degree of overlap including a separation distance between the inboard edge of the protruding wing section and the outboard edge of the adjacent wing section. The at least two wing sections may further include a wing tip section. The wing tip section may nest within a lumen of the wing span section in the collapsed configuration, and at least a portion of the wing tip section may protrude from within the lumen of the wing span section in the extended configuration. The collapsible wing may further include a wing tip end plate or a winglet attached to the wing tip section. The wing tip section may further include a connector and the wing tip end plate or the winglet may further include a mating connector. The wing tip end plate or the winglet may be removed from the wing tip section when the wing is in the collapsed configuration; and the wing tip end plate or the winglet may be attached to the wing tip section by mating the connector and the mating connector when the wing is in the extended configuration. The wing tip section may further include a grip to facilitate the deployment of the wing. The grip may be chosen from any one or more of: a strap, a handle, an indented lip, or a gripping structure to facilitate the deployment and collapsing of the wing. The wing may further include one or more movable control surfaces consisting of an aileron, a flap, or a flap and an aileron. The any one or more of the at least two wing sections may integrates each of the one or more movable control surfaces. Each movable control surface may further include a connector and each corresponding wing section may further include a mating connector. Each movable control surface may be removed from the corresponding wing section when the wing is in the collapsed configuration; and each movable control surface may be attached to the corresponding wing section by mating the connector and the mating connector when the wing is in the extended configuration. The wing may further include one or more actuators situated within any one or more of the at least two wing sections to effectuate movement of the one or more movable control surfaces. The wing may further include at least one additional transmissive element chosen from one or more of: electrical wires, cables, or optical fibers, the at least one additional transmissive element situated within any one or more of the at least two wing sections to transmit any one or more of power, control command signals, sensor signals, and any combination thereof. Each wing section may include a taper that includes an outboard chord length at an outboard edge of the wing section shorter than an inboard chord length at an inboard edge of the wing section. The taper of each wing section may mechanically limit the protrusion of each wing section to prevent separation of adjacent wing sections during deployment to the extended configuration. All degrees of overlap may be equal to one another, or a first degree of overlap between the wing root section and the protruding wing span section may be larger than a second degree of overlap between the wing span section and the protruding wing tip section. The wing may further include one or more locking elements situated within the at least one overlap region to reversibly secure adjacent wing sections in the extended configuration. A first portion of the one or more locking elements situated within one overlap region may be spatially staggered with respect to other locking elements situated within other overlap regions. Each of the at least two wing sections may include a thin membrane formed into an airfoil cross-sectional shape surrounding the lumen. Each thin membrane of each wing section may include any one or more of: metals, metal alloys, plastics, woods, composite materials, and any combination thereof. Each thin membrane of each wing section may include a membrane thickness characterized by one of: all thin membranes of all wing sections have a uniform membrane thickness; each membrane thickness of each wing section is different from each other wing section; or each membrane thickness varies within each wing section. Each outboard edge of each wing section may further include an outboard edge profile forming a gradual transition in thickness from an exposed surface of the protruding wing section to an exposed surface of the adjacent wing section, the outboard edge profile comprising: a flat ramp, a rounded corner, a series of smaller steps, and any combination thereof. The wing may further include a covering situated over the at least two wing sections in the extended configuration to form a smooth, seamless wing surface. The wing may further include an additional mechanical element to aid in the deployment and collapse of the wing. The additional mechanical element may include one or more of: cables, pulleys, pushrods, screwjacks, and any combination thereof.

Other aspects and iterations of the disclosure are described in detail below.

DESCRIPTION OF FIGURES

The following figures illustrate various aspects of the embodiments.

Corresponding reference characters indicate corresponding elements among the views of the drawings. Any headings or labels used in the figures should not be interpreted to limit the scope of the claims.

DETAILED DESCRIPTION

Various aspects provide a collapsible wing, aircraft and systems that include the collapsible wings, methods of producing the collapsible wings, and methods of using the collapsible wings. The collapsible wings include at least two wing span sections that may be stored in a collapsed configuration in which a smaller wing span section is nested inside a spanwise lumen within a larger adjoining wing span section. To deploy the wings in an extended configuration, the smallest wing span section, typically the wing tip section, is deployed in an outboard direction away from the other nested wing span sections, resulting in an outboard sliding movement of each wing span section relative to its corresponding larger adjacent wing span section, culminating in a fully extended wing in an extended configuration. The collapsible wing may be extended and collapsed by a single person without need for specialized tools.

Each of the collapsible wings in the collapsed configuration may be packed for transport within a container or backpack with dimensions corresponding to the wing's longest chord length, the span length of the wing's largest wing span section, and the maximum thickness of the wing. For example, in the collapsed configuration, the collapsible wing may fit within a volume with dimensions of about one foot by one foot by a few inches in one aspect. Further, each collapsible wing may have a relatively low weight due to the use of light-weight, high-strength composite materials. The compact size of the collapsible wings in a collapsed state, combined with each wing's low weight and ease of assembly, result in a wing structure that is ideally suited for portable aircraft applications such as unmanned aircraft systems (UAS) that may be carried and deployed by personnel in remote locations in a relatively short time without need for specialized training or tools.

A detailed description of aspects of the collapsible wing design, methods of fabricating the collapsible wing, UAS and associated air vehicles that incorporate the collapsible wing, and methods of using the collapsible wing in air vehicles such as the air vehicles of an UAS are described in detail herein below.

I. Collapsible Wing

In one aspect, a collapsible wing is provided that includes a series of wing sections that may be nested within one another in a collapsed configuration. In the collapsed configuration, the collapsible wing not only achieves minimal size for ready transportation in existing backpacks typically used by personnel in remote operations, but the nested arrangement of wing span sections offers enhanced protection of the wing span sections from physical damage during transport. To convert the collapsed wing to a functional extended wing configuration, the wing sections may be translated relative to one another by deploying the outermost wing tip section in an outboard, resulting in a telescope-like movement of the wing sections into an extended configuration. The wing sections may be secured in the extended configuration using a locking mechanism, described in detail herein below.

A. Collapsed Configuration

Figure 1:
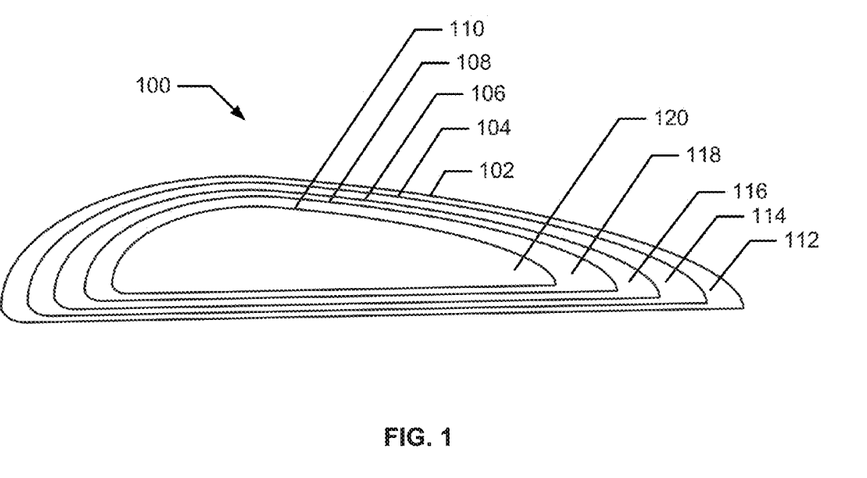
FIG. 1 is a chordwise side view of a collapsible wing in a collapsed position.

A side view of a collapsible wing 100 in the collapsed configuration is illustrated in FIG. 1. In general, the collapsible wing 100 includes at least one wing span section nested within a second wing span section. In an aspect, the nested wing span sections may include a wing root section 102 and a wing tip section 110. For purposes of illustration, five nested wing span sections 102-110 are illustrated in FIG. 1. Each of the wing span sections 102-110 is formed from a thin membrane in an airfoil cross-sectional shape as shown in FIG. 1. In addition, the thin membrane of each wing span section 102, 104, 106, 108 defines a lumen 112, 114, 116, and 118, respectively. Each of the lumens 112-118 extends the full spanwise length of each of the wing span sections 102-108. In addition, each of the lumens 112-118 opens at both the inboard and outboard ends of each of the wing span sections 102-108. The thin membrane of the wing tip section 110 defines a lumen 120 that extends the full span of the wing tip section 110 and opens at the section's inboard end; the lumen 120 may sealed at the outboard tip of the wing tip section 110.

The outboard tip of the wing tip section 110 may further include additional structures or elements (not shown) to facilitate the deployment and collapsing of the wing. In an aspect, the outboard tip of the wing tip section 110 may further include a strap, a handle, or an indented lip to provide a grip used by the operator of the UAS when moving the wing tip inboard or outboard. In another aspect, the wing tip section 110 may further include additional aerodynamic surfaces including, but not limited to, wing tip end plates, winglets, and/or moveable control surfaces; these additional aerodynamic surfaces may enhance the overall aerodynamic performance of the UAS in use. In additional aspects, the additional aerodynamic surfaces may be integrated into the structure of the wing tip section 110 or the additional aerodynamic surfaces may be provided as separate structures that are attached to the wing tip section 110 during deployment of the wing by way of mating connectors integrated into the structure of the wing tip section 110 and additional aerodynamic surface.

As illustrated in FIG. 1, when the wing 100 is in the collapsed configuration, the wing tip section 110 is nested within the lumen 118 of wing span section 108, the wing span section 108 is nested within the lumen 116 of wing span section 106, the wing span section 106 is nested within the lumen 114 of wing span section 104, and the wing span section 104 is nested within the lumen 112 of wing span section 102. In general, the collapsible wing 100 may include any size and number of wing span sections without limitation; design considerations related to the selection of the size and number of wing span sections are described in detail herein below.

B. Extended Configuration

The collapsible wing 100 may be transformed reversibly from a collapsed configuration to an extended configuration by externally pulling the wing tip section 110 in an outboard direction, causing each of the wing span sections 104-110 to translate in an outboard direction relative to each corresponding adjacent wing span section. As illustrated FIG. 2, when the wing tip section 110 is moved in an outboard direction, the wing tip section 110 translates outboard relative to its adjacent wing span section 108, the wing span section 108 translates outboard relative to its adjacent wing span section 106, the wing span section 106 translates outboard relative to its adjacent wing span section 104, and the wing span section 104 translates outboard relative to its adjacent wing span section 102.

In an aspect, each of the wing span sections 102-110 may incorporate one or more mechanical limits designed to prevent the overextension and/or separation of adjacent wing span sections during deployment. In one aspect, shown in FIG. 2, the chord length at the outboard edge of each wing span section may taper to a shorter length than the corresponding chord length at the inboard edge. For example, as result of this taper, the chord length at the inboard edge 214 of wing span section 104 may be larger than the size of the opening of the lumen 112 of the adjacent wing span section 102 at its outboard edge 216. This size difference mechanically limits the outboard translation of the wing span section 104, preventing the separation of this section during deployment.

Figure 4A:
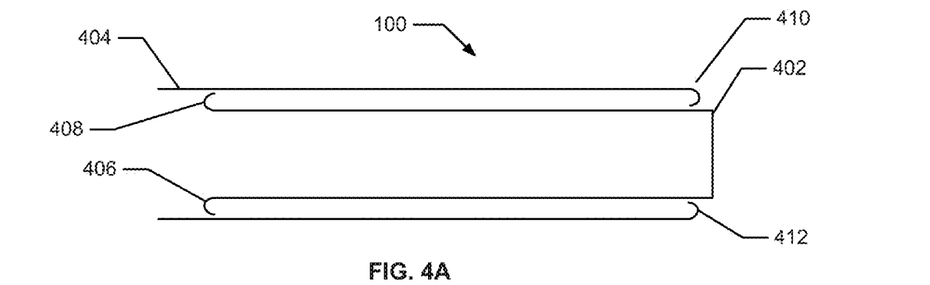
FIG. 4A is a top cross-sectional view of an interlocking flange locking mechanism for a collapsible wing in the collapsed configuration.
Figure 4B:
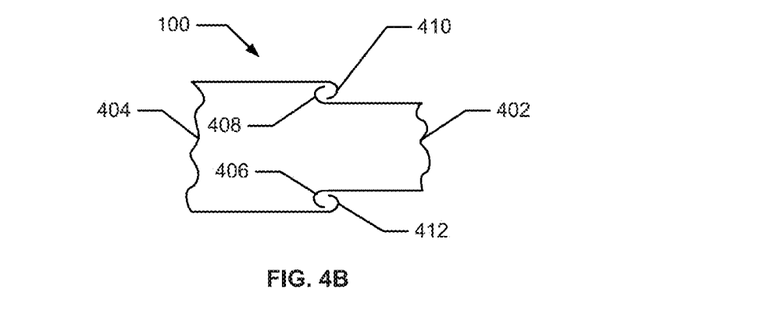
FIG. 4B is a top cross-sectional view of an interlocking flange locking mechanism for a collapsible wing in the extended configuration.

In another aspect, shown in FIG. 4A, the collapsible wing 100 may include interlocking flanges 406 and 408 on the inboard end of a first wing span section 402 and flanges 410 and 412 on the outboard end of a second wing span section 404. The collapsible wing 100 in this aspect is illustrated in a collapsed configuration in FIG. 4A. When the first wing span section 402 is moved in an outboard direction to deploy the wing 100, as shown in FIG. 4B, the interlocking flanges 406 and 408 mechanically lock with interlocking flanges 410 and 412, respectively, preventing the overextension and separation of the first wing span section 402 from the second wing span section 404. The interlocking flanges 406, 408, 410, and 412 may further define a pre-specified extension limit for the collapsible wing 100 in the extended configuration.

The amount of force applied to the wing tip section 110 in order to deploy the wing span sections 102-110 may be specified such that a single person may deploy the wing span sections 102-110. The wing root section 102 may be maintained in a relatively fixed position to facilitate the transformation of the wing 100 into an extended configuration. For example, the wing root section 102 may be attached to the fuselage of an air vehicle as described herein below prior to deploying the wing 100 into the extended configuration, or the wing root section 102 may be held in a fixed position by a second person during deployment. In another example, the wing root section 102 may be pulled in an inboard direction opposite to the outboard movement of the wing tip section 110.

In another aspect, the wing 100 may be deployed by gravitational forces induced by pointing the wing in a downward direction and allowing the wing tip section to slide downward along with any other wing span sections. In yet another aspect, the wing 100 may incorporate mechanical elements including, but not limited to, cables and/or pulleys, pushrods, screwjacks, and any other suitable mechanical element known in the art, to provide an enhanced mechanical advantage to a person deploying the wing 100, or to direct an applied force into a direction suitable for wing deployment.

Figure 2:
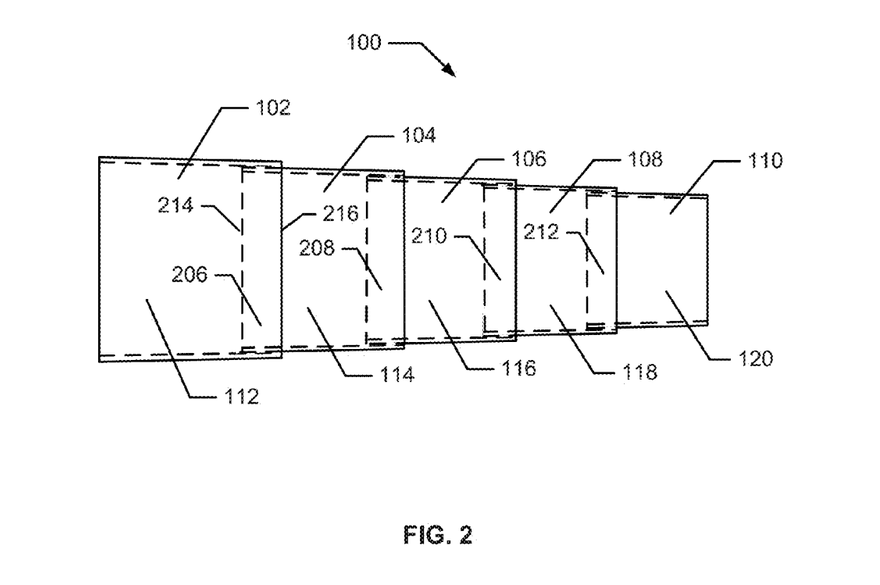
FIG. 2 is a top view of a collapsible wing in an extended position.

A top (planform) view of the wing 100 in the extended configuration is illustrated in FIG. 2. As viewed from above, the wing span sections 102-110 may be rectangle-shaped, as illustrated in FIG. 2. In an aspect, each wing span may be tapered such that each wing span section has a shorter or longer chord length at the outboard end relative to the inboard end of the wing span section. In order to nest together efficiently in the collapsed configuration, the taper of each wing span section may consistently increase or decrease in the outboard spanwise direction in another aspect. In an additional aspect, the planform shape of the wing span sections 102-110 may be sized, tapered, and dimensioned such that each wing span section 104-110 slips easily into the lumen 112-118 of each corresponding adjacent outboard wing span 102-108, respectively. In this aspect, the selected airfoil or shape of the root airfoil may change in subsequent outboard wing span sections to facilitate proper movement of the wing span sections and to ensure sufficient continuity of the wing span sections to meet the design goals of the UAS.

Figure 3:
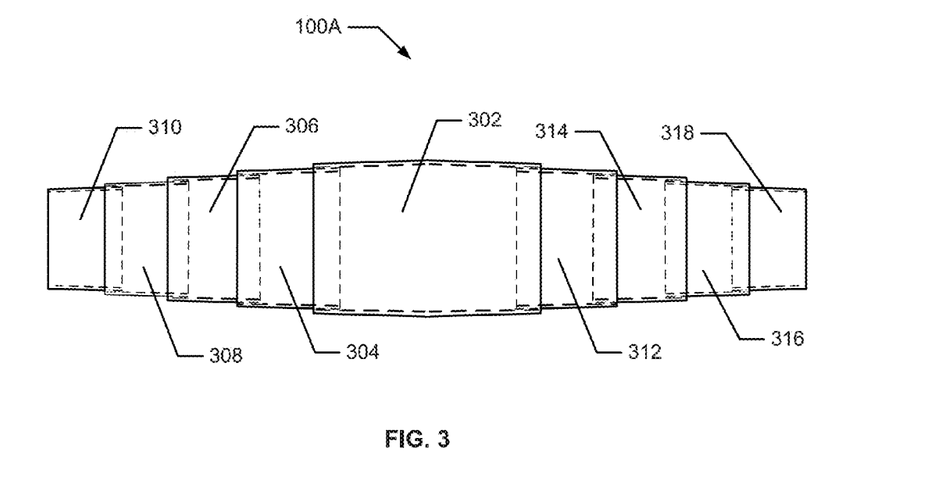
FIG. 3 is a top view of a full-span collapsible wing in an extended position.

In another aspect, the collapsible wing may extend the full wingspan, rather than extending approximately half of the total wing span (not including the width of the fuselage) as illustrated in FIG. 2. FIG. 3 is an illustration of an aspect of a full-span collapsible wing 100A shown in the extended configuration that includes a central section 302 or cavity within a fuselage section, left wing span sections 304-310 and right wing span sections 312-318. In the collapsed configuration, the left wing span sections 304-310 nest within each other and the right wing span sections 312-318 nest within each other in a similar manner to the collapsible wing 100 shown in FIG. 1. In addition, the left wing root section 304, which contains the nested left wing span sections 306-310, and the right wing root section 312, which contains nested right wing span sections 314-318, are both nested within the lumen of the central section 302. As a consequence, the spanwise dimension of the central section 302 may be at least twice the spanwise dimension of the left and right wing root sections 304 and 312 in order to completely nest these sections in the collapsed configuration.

The full-span collapsible wing 100A may include interlocking flange elements similar to those described previously for the collapsible wing 100 to prevent the overextension and/or separation of wing span sections during the deployment of the wing 100A. In an additional aspect, the interlocking elements may be designed to be deactivated in order to remove a subset of the wing 100A including, but not limited to, the left wing or the right wing or any wing span section thereof, in order to facilitate repair or replacement of a damaged section of the full-span collapsible wing 100A.

To extend the full-span collapsible wing 100A from the collapsed configuration to the extended configuration, the left and right wing tips 310 and 318 may be deployed independently in opposing outboard directions away from the central section 302. The outboard forces applied to the left and right wing tips 310 and 318 induce the translation of adjacent wing sections 304-310 and 312-318 in an outboard direction relative to each other, resulting in extension of all wing sections into the extended configuration.

C. Number and Size of Wing Span Sections

Any number of wing span sections may be included in various aspects of the collapsible wing 100. The number, length, dimensions, thickness, and composition of the wing span sections may be selected based on any one or more of at least several factors including, but not limited to: the desired function of an aircraft including the collapsible wing 100, the total wingspan of the collapsible wing 100 in the extended configuration, the desired wingspan of the collapsible wing 100 in the collapsed configuration, the desired structural integrity of the extended wing structure, the desired overall weight of the collapsible wing 100, and the size of the wing span sections making up the collapsible wing 100, in particular the chord length and individual wing span section lengths in the spanwise direction. In an aspect, the collapsible wing 100 includes at least two wing span sections. In another aspect, the collapsible wing 100 may include from about two to about ten wing span sections.

In yet another aspect, the number of wing span sections may be limited by the thickness of the material making up each wing span section. Referring again to FIG. 1 and FIG. 2, each wing span section must be smaller than its corresponding adjacent outboard wing span section in order to nest within the lumen of the corresponding adjacent outboard wing span section in the collapsed configuration. As a result, each successive outboard wing span section must be reduced in size in all dimensions in order to fit within the lumen of its corresponding adjacent inboard wing span section. The reduction in size of successive wing span sections may depend on one or more of at least several factors including, but not limited to: the thickness of the material making up each wing span section, changes in the airfoil section between wing span sections, the incorporation of additional elements such as electrical wires, cables, or optical fibers within the lumens of the wing span sections to transmit power, control commands, and/or sensor signals within the air vehicle, and the particular locking mechanism incorporated to secure the wing span sections in the extended configuration.

The size of each of the wing span sections 102-110 may be any size and may be specified by any one or more of at least several factors including, but not limited to: the desired performance of the collapsible wing in use; the overall size, design, and mission of the air vehicle in which the collapsible wing is incorporated; the portability of the collapsible wing in the collapsed configuration; the desired structural integrity of the collapsible wing in use; the number of wing span sections included in the collapsible wing; and the thickness of the thin membrane formed into the airfoil shape of each wing span section.

In an aspect, if the collapsible wing is to be incorporated into an air vehicle of an unmanned aircraft system, the overall size and weight of the system in a disassembled state may be reduced as much as possible, since both of these characteristics contribute to the portability of the system and the weight of the air vehicle. In the disassembled state of the air vehicle, the collapsible wing is typically transported in a collapsed configuration, in which the outboard wing span sections are nested within the wing root section. As a result, the largest dimensions of the collapsible wing in the collapsed configuration correspond to the dimensions of the wing root section. For example, to enhance portability the wing root section may be dimensioned such that the collapsible wing may be transported in a typical backpack used by personnel in remote operation. In this example, the maximum dimensions of the wing span sections may be about 18 inches in the spanwise and chordwise directions, and about 4 inches thick. In another aspect, the maximum dimensions of the wing span sections may be up to about 9 inches in the spanwise direction, up to about 6 inches in the chordwise direction, and up to about two inches in thickness. The overall size of the wing in the collapsed configuration can and will vary without limitation depending on the particular design of the associated air vehicle.

D. Overlap Between Wing Span Sections

Referring again to FIG. 2, each of the wing span sections 104-110 in the extended configuration protrudes in an outboard direction from a spanwise lumen 112-118, respectively, of a corresponding adjacent wing span section 102-108, situated inboard of each wing span section 104-110, and ending at the wing tip section 110 in the most outboard position of the wing. Each of the wing sections 104-110 typically does not protrude completely from its respective lumen 112-118, respectively, resulting in an overlap region 206-212, respectively. In an aspect, each overlap 206-212 may further contain one or more locking mechanisms to secure the wing span sections in the extended configuration, discussed in detail herein below, to hold the wing span sections 102-110 in a fixed position during use at a variety of typical load conditions.

The degrees of overlap 206-212 between adjacent wing span sections 102-110 may be specified to fulfill any one or more of at least several design goals, including but not limited to: enhancing the structural integrity in the presence of aerodynamic loads at selected air vehicle operating conditions, providing the space necessary to contain the one or more locking mechanisms in a functionally effective configuration, and minimizing the overall weight of the wing structure. In an aspect, the degree of overlap may result from a balance of conflicting design goals, such as the balancing of reduced weight, which suggests a reduction of the degree of overlap, against the enhancement of structural integrity, which suggests an increase in the degree of overlap between adjacent wing span sections 102-110.

In an aspect, the degree of overlap may be equal between all adjacent wing span sections 102-110, as illustrated in FIG. 2. In another aspect, the degree of overlap may vary between different pairs of adjoining wing span sections. For example, the degree of overlap 206 between a pair of inboard wing span sections 102 and 104 may be specified to be higher than the degree of overlap 212 between a pair of more outboard wing span sections 108 and 110. In this example, the higher degree of overlap 206 preserves the wing's structural integrity near the wing root 202 where the bending moments due to aerodynamic wing loads are likely to be higher, and the lower degree of overlap 212 preserves the wing's structural integrity near the tip 204 of the wing 100, where the bending moments are likely to be reduced. In addition, by situating the higher degree of overlap in those areas likely to experience the highest loads, the overall weight of the wing 100 may be reduced.

In an aspect, the overlap distance between a protruding wing span section and the adjacent inboard wing span section may range from about 5% to about 35% of the total spanwise dimension of the protruding wing span section in the extended configuration. In another aspect, the overlap distance between a protruding wing span section and the adjacent inboard wing span section may range from about 10% to about 20% of the total spanwise dimension of the protruding wing span section in the extended configuration. In yet another aspect, the overlap distance between a protruding wing span section and the adjacent inboard wing span section may be about 15% of the total spanwise dimension of the protruding wing span section in the extended configuration. For example, if a wing span section has a total spanwise dimension of about 9", this wing span may have an overlap distance of about 1.5" (about 16% of the total spanwise dimension) when the wing is in an extended configuration. The overlap distances between adjacent wing span sections can and will vary depending on the particular design requirements of the air vehicle.

D. Locking Mechanism

In an aspect, adjacent wing span sections in the extended configuration may be reversibly secured to each other through an internal locking mechanism, ensuring stability of the wing structure during flight and allowing the collapsible wing to achieve and maintain its full span in the extended configuration. In an aspect, a locking mechanism may be incorporated at each overlap region between adjacent wing span sections. Referring back to FIG. 2, locking mechanisms may be incorporated to secure each of the overlaps 206-212 in a fixed position when the wing 100 is in an extended configuration.

In an aspect, the locking mechanism used to secure a particular overlap region may include a first locking element integrated within the structure of the more inboard wing span section, and a second locking element integrated within the structure of the more outboard wing span section. For example, referring to FIG. 2, to secure the overlap 206 in a fixed position when the wing 100 is in an extended configuration, a first locking element may be integrated within the structure of the root wing section 112 and a second locking element may be integrated within the structure of the wing span section 114. In the extended configuration, the first locking element may be reversibly engaged with the second locking element, resulting in a fixed orientation of root wing section 112 and wing span section 114.

Any known locking mechanism including any known locking elements or combination of known locking elements that generate a reversible holding force may be used as locking elements in the collapsible wing 100. Non-limiting examples of suitable locking mechanisms include a friction mechanism, a locking tab mechanism, a slotted locking mechanism, and a magnetic locking mechanism. The locking mechanism may be selected based in any one or more of at least several factors, including but not limited to the added weight of the locking mechanism, the strength of the locking system when the elements are reversibly engaged, the size of the locking mechanism as it relates to the ability of the locking mechanism to fit within the confines of the collapsible wing, the absence of external protuberances that may add to the parasite drag of the collapsible wing in use, and the ability of the locking mechanism to function without the use of tools and/or with the need to manipulate internal mechanisms to engage and disengage the locking elements. The wing span sections of the collapsible wing are held securely in place during flight by the locking mechanism. To expedite the deployment of the UAV in the field in time-sensitive scenarios, the locking mechanism may be selected to be employed relatively quickly and without need for precise manipulation or tools. For example, it may be impractical for an operator to use a screwdriver or insert a locking pin through a small hole while wearing gloves or other protective gear under adverse field conditions. Further, the locking mechanism may be selected to be easily disengaged when collapsing the wing into the collapsed configuration for wing storage or transport.

In an aspect, the first and second locking elements may be attached at any location on the more outboard and more inboard adjacent wing span sections associated with an overlap region, so long as the elements of the locking mechanism reversibly engage when the wing is extended to the extended configuration. At each overlap region, the locking mechanism may comprise two or more first locking elements that reversibly engage with two or more corresponding second locking elements.

In another aspect, the locking elements associated with one overlap region may be spatially staggered with respect to other locking elements associated with the other overlap regions of the collapsible wing. In this aspect, the staggering of the locking elements associated with different overlap regions reduces the inadvertent interaction and/or engagement of locking elements of different overlap regions, resulting in the locking of the wing span sections in an incompletely or inappropriately extended configuration.

In yet another aspect, the locking mechanism may include mechanical locking elements. For example, the inner surface of one wing span section may contain a dimple or socket which reversibly engages a ball bearing or spring loaded pin mounted on the outer surface of the adjacent wing in order to secure the extended wing span sections in place.

As described previously in FIG. 4, the locking mechanism may include interlocking flanges 406-412 that mechanically interlock when the wing 100 is deployed to the extended configuration. In still another aspect, the locking mechanism may be a frictional locking mechanism comprising a frictional force between the mating surfaces of two adjacent wing span sections. In use, the frictional locking mechanism may prevent the wings of a UAV from collapsing during flight due to anticipated aerodynamic loads. Upon landing, the operator of the UAV may manually apply a force sufficient to overcome the resistance of the frictional locking mechanism and re-collapse the wing for storage and/or transport.

Figure 5:
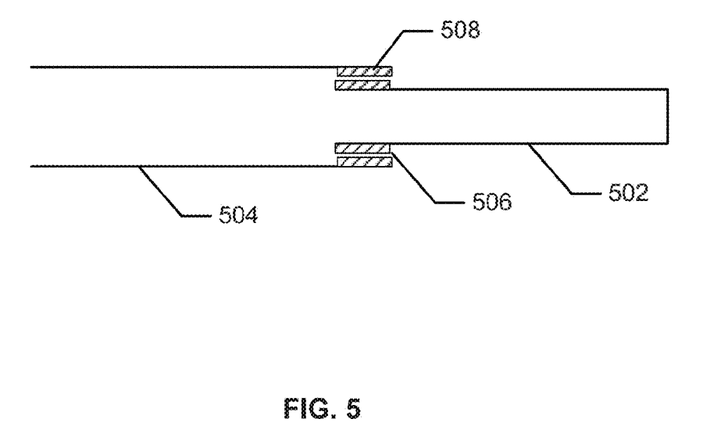
FIG. 5 is a front cross-sectional view of a locking mechanism for a collapsible wing that includes frictional linings on the contacting surfaces of adjacent wing sections.

As shown in FIG. 5, a frictional force between two wing span sections such as a wing tip section 502 and a wing root section 504 may result from a frictional lining 506, 508 applied to the inside of the wing span sections at specific locations such that the frictional linings 506, 508 engage when the collapsible wing is in the extended position. The frictional linings may be applied to the surfaces of both mating wing span sections, as illustrated in FIG. 5, or to only one of the mating wing span sections. The frictional surfaces may secure the wing span sections upon complete overlap of the frictional surfaces, as illustrated in FIG. 5, or after a partial overlap of the frictional surfaces. One or both wing span sections of an overlap region may further include additional structural features including, but not limited to, raised ridges, raised lips, or raised bumps to enhance the function of the frictional linings in securing the wing in the extended configuration.

The frictional lining may be composed of any material capable of generating sufficient static friction force. For example, materials having a low Poisson's ratio including, but not limited to, cork or rubber may serve as a frictional lining material. The frictional lining material may be a liquid material including, but not limited to, a rubbery polymer, which may be coated on to the surfaces of the wing span sections 502 and 504 and allowed to dry. Because the frictional lining material may be deformable, the tolerances of the carbon fiber construction of the collapsible wing may be somewhat relaxed. The frictional lining material may function both as a locking mechanism and as a vibration-damping cushion between adjacent wing span sections.

Figure 6:
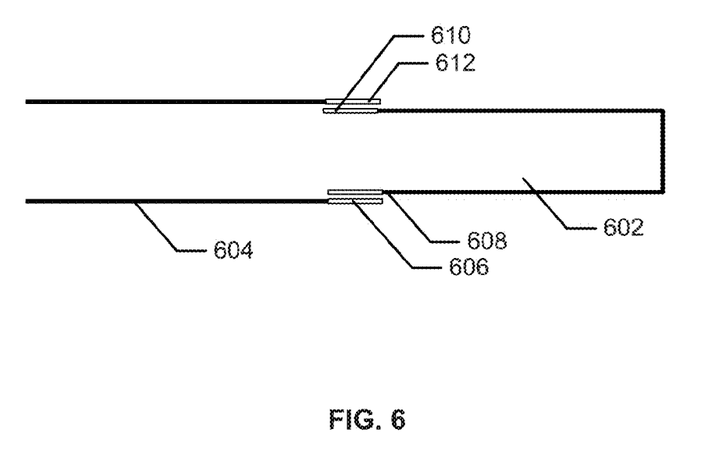
FIG. 6 is a front cross-sectional view of a locking mechanism for a collapsible wing that includes paired magnets imbedded in adjacent wing sections.

In an additional aspect, the locking mechanism may be a magnetic locking mechanism comprising a magnetic force between the mating surfaces of two adjacent wing span sections. As illustrated in FIG. 6, the locking elements of the magnetic locking mechanism may be pairs of magnets 606/608 and 610/612 attached to or integrated into the skins of the wing root section 604 and the wing tip section 602. For example, extremely thin, 0.03" thick magnets may be integrated into the skin of the wing (which may be about 0.06" thick in this example). The magnets may be made of a highly magnetic material including, but not limited to, Grade N-42 neodymium and may provide an attractive force of about 2 lbs. per pair of magnets in this configuration. In this aspect, from about two to about four pairs of magnets may provide the magnetic locking mechanism between adjacent wing sections associated with an overlap region.

The poles of the magnets in this aspect may be oriented in an opposed arrangement in adjacent wing spar sections so that the alignment of the positive and negative poles may facilitate the securing of the wing span sections in the extended configuration. To reduce unwanted magnetic interactions when extending the wing span sections, the magnets may be arranged in a staggered pattern so that each magnet attracts only its corresponding counterpart on the adjacent wing span section. This magnetic locking mechanism takes advantage of the close spacing tolerances between adjacent wing span sections, which allow the magnets to be situated sufficiently close for generating significant magnetic forces. To collapse the wing, the user may generate a force in the spanwise direction sufficient to overcome the magnetic forces.

In another additional aspect, the locking mechanism may be an external locking mechanism. Any external locking mechanism that fixes the wing span sections in a fixed position during use may be used, including but not limited to adhesive tape wrapped around the overlap region between two adjacent wing span sections. In yet another additional aspect, "button style" tabs situated in about 2-4 locations on the top and bottom surfaces of a wing span section may engage corresponding female receptacles formed in the inner surface of the corresponding inboard wing span section to secure adjacent wing span sections in place in the extended configuration. In this aspect, the operator may lift up on the tabs to release each tab from its corresponding female receptacle, thereby facilitating the conversion of the wing into the collapsed configuration.

E. Wing Airfoil Shape and Aerodynamic Design

The aerodynamic design of the collapsible wing 100 may be any existing or custom design, and may be selected based on any one of at least several factors including, but not limited to: the intended purpose of the aircraft including the collapsible wing 100, the desired weight of the wing 100 and air vehicle, and the desired aerodynamic performance of the wing 100. Non-limiting examples of aspects of the aerodynamic performance of the wing 100 include the maximum sectional lift coefficient; aerodynamic stability; susceptibility to stalling in response to wind gusts, reduced airspeeds, or severe maneuvers; induced drag; airfoil sectional lift to drag ratio $c_{i,max}/c_d$; overall air vehicle lift coefficient ($C_L$); and overall air vehicle drag coefficient ($C_D$).

The maximum sectional lift coefficient ($c_{i,max}$) and the airfoil sectional lift to drag ratio are governed in part by the airfoil's cross-sectional profile. Without being limited to any particular theory, the maximum sectional lift coefficient may be enhanced by the inclusion of camber in the airfoil profile. However, the inclusion of camber may adversely impact other characteristics of the collapsible wing structure. For example, the curvature of cambered wing span sections may possess a higher overall thickness than a corresponding uncambered wing span section, which may impact the portability of the collapsible wing 100 in the collapsed configuration due to both the increased size of the collapsed wing as well as the increased difficulty of arranging a curved surface within the confines of a typical backpack used by personnel in remote operations.

Figure 7:
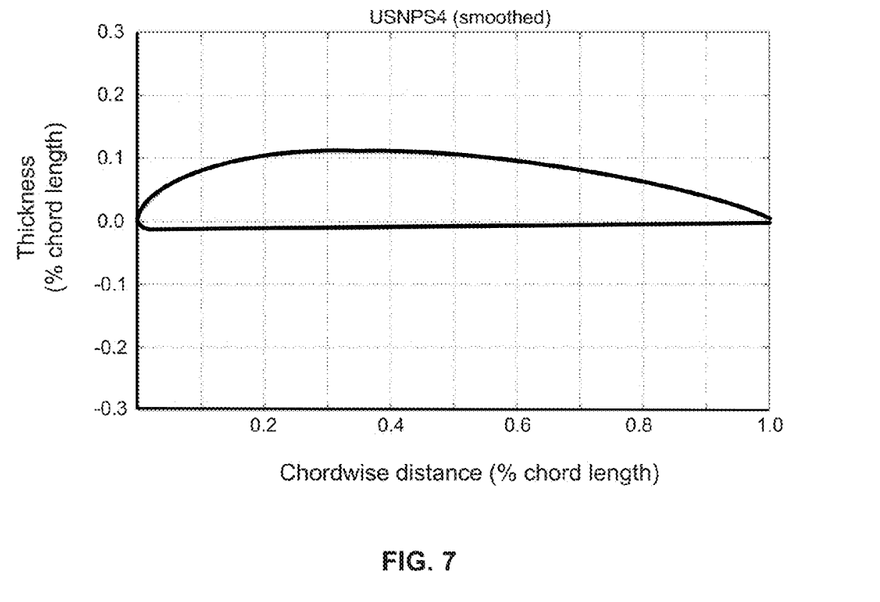
FIG. 7 is an illustration of an airfoil profile suitable for use in a collapsible wing.

In an aspect, the cross-section airfoil profile may be an uncambered airfoil, including but not limited to the USNPS4 profile as illustrated in FIG. 7. Non-limited examples of suitable airfoil profiles and relevant aerodynamic performance characteristics at a Reynolds number of 100,000 (representative of the typical operating conditions of a small unmanned aircraft system (SUAS)) are summarized in Table 1:

TABLE 1

Airfoil Sections Suitable for Collapsible Wing Structures.

| Airfoil | ($C_{l,max}/C_d$) | $C_{l,max}$ |
|---|---|---|
| S7075 | 53 | 1.26 |
| S4083 | 37 | 1.29 |
| S7055 | 23 | 1.33 |
| S8037 | 40 | 1.26 |
| SG6043 | 59 | 1.43 |
| USNPS-4 | 52 | 1.45 |

Other aerodynamic characteristics of the wing 100 may be influenced by other airfoil characteristics, including but not limited to the wing area, wing loading, wing span, chord length, camber, thickness, and aspect ratio. For example, aspect ratio, without being limited to any particular theory, may influence the induced drag of the air vehicle incorporating the wing 100. In order to reduce the induced drag, a high aspect ratio wing having a relatively long wingspan and a relatively narrow chord length may be indicated. In addition, the chord length at the wing tip may be shorter than the chord length at the wing root in order to reduce induced drag. However, in the context of an unmanned aircraft system, a long wing span may negatively impact the portability of the collapsible wing, and may further increase the difficulty of achieving a hand-launch typically used to initiate the flight of the air vehicle. In addition, a higher aspect ratio may also reduce the wing area if wing span is not correspondingly increased to maintain similar aircraft lift characteristics, thereby increasing the wing loading of the air vehicle.

In an aspect, the external geometry of the collapsed wing may be modified to enhance the aerodynamic performance of the wing in the extended configuration. The outboard edges of each wing span section may be machined using any known method including but not limited to grinding, sanding, and chemical machining, in order to form a more gradual transition from the surface of one wing span section to the adjacent wing span section. For example, the outboard edges may be shaped into a flat ramp, a rounded corner, a series of smaller steps, or any other shapes to make the transition between adjacent wing span sections more gradual. In another aspect, the extended wing section may be covered in a tightly fitting, glove-like covering to smooth out the overall exterior surface of the wing in order to enhance aerodynamic performance if a smooth, seamless wing surface is indicated as beneficial given the anticipated operational environment of the air vehicle. In this aspect, the glove-like covering may incorporate surface texturing in critical regions of the wing including, but not limited to, the upper surface of the wing, in particular in a region located roughly 25% of the chord length back from the wing's leading edge. In one aspect, the surface texturing may induce the transition of the airflow from a laminar flow to a turbulent flow, thereby enhancing the aerodynamic performance of the wing.

In an aspect, the aerodynamic design of the collapsible wing 100 trades off the various constraints of the UAS associated with portability, ability to assemble and launch the air vehicle in the field, and the aerodynamic performance of the air vehicle in operation. In one particular aspect, the aspect ratio of the collapsible wing 100 may range from about 8 to about 10. The wing loading of the collapsible wing 100 in this aspect may range from about 1 to about 1.6 lb./ft$^2$. The aerodynamic design of the collapsible wing 100 can and will result in any range of dimensions and features in any combination without limitation including, but not limited to: wing span, chord length, sweep, taper, camber, area, and any combination thereof, in accordance with standard design practices well-known in the art.

E. Materials Used to Construct Collapsible Wings

The materials used to construct the wing span sections of the collapsible wing may be any existing material or custom composite material, in particular any materials commonly used in the construction of air vehicles. In an aspect, the materials may be selected based on one or more of at least several factors including, but not limited to: the strength of the material; the density of the material; the hardness, durability, and crack resistance of the material; the sensitivity of the material to environmental factors associated with use in the field such as changing temperature, humidity, and abrasion; the cost of the material; and the ease of fabricating the collapsible wing using the material. Non-limiting examples of materials suitable for the construction of a collapsible wing include metals and metal alloys including but not limited to aluminum, titanium, and steel; plastic; wood; and composite materials such as carbon fiber epoxy composite materials.

In an aspect, the material used to construct the collapsible wing span sections may be a carbon fiber epoxy composite material, resulting in an enhanced strength to weight ratio of the resulting collapsible wing. Any known technique of producing structures from carbon fiber epoxy composite materials may be used to construct the collapsible wing span sections including, but not limited to: wet lay up, dry layup, resin induction molding, compression molding, and filament winding. The carbon fiber material may be preimpregnated with resin prior to use, or the resin may be applied or incorporated into the carbon fiber material after the material has been arranged into the desired shape for the collapsible wing span section. Any other known method may be used to fabricate the collapsible wing span sections without limitation.

Figure 8:
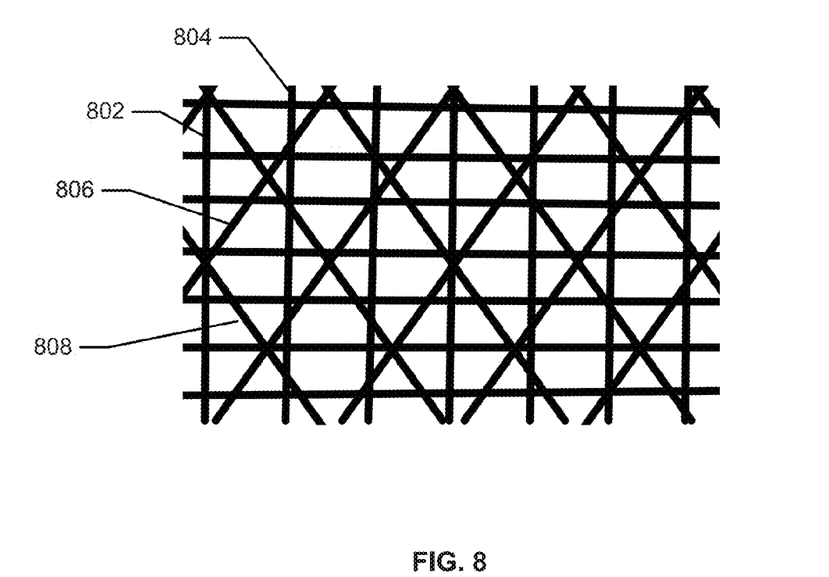
FIG. 8 is an illustration of the orientation of the composite layers used to construct a collapsible wing in an embodiment.

In an additional aspect, the carbon fiber epoxy composite may be fabricated in at least one or more layers to provide suitable structural integrity. In another aspect, each wing span section may be fabricated from one or more layers of carbon epoxy composite in which the carbon fibers 802-808 of each layer are aligned at different angles relative to the spanwise direction of the wing as illustrated in FIG. 8. In an aspect, the angle of each layer relative to the spanwise direction of the wing may range from 0° to 90°. Without being limited to any particular, the arrangement of composite fibers illustrated in FIG. 8 may enhance the structural integrity of the wing span section under a variety of loading conditions anticipated during use.

In another aspect, the number of layers of composite material may range from 1 to about 5 or more, depending on factors including but not limited to the size of the air vehicle, the overall wing span, the size of the wing span section, and the desired weight of the collapsible wing. In yet another aspect, the number of layers of composite materials may be the same for all wing span sections of the collapsible wing, or the number of layers of composite materials may vary between the different wing span sections. In still another aspect, the number of layers used in the construction of inboard wing span sections near the wing root may be higher than the number of layers used for more outboard wing span sections near the wing tip. In this aspect, the number of layers used in the construction of the wing span sections may continuously decrease as a function of outboard distance away from the fuselage. Without being limited to any particular theory, the anticipated loading on the wing structure, in particular the bending moment, may be highest near the wing root and may be negligible at the wing tip. As a result, less material may be needed to maintain the structural integrity of the collapsible wing near the wing tips. Due to the reduction in material achieved in this aspect, the overall weight of the collapsible wing may be reduced relative to a wing having a constant number of composite layers in all wing span sections.

Without relying on any particular theory, the layout of the layers in the wing may be custom designed to reinforce the wing structure in a particular direction or region where significant forces or stresses may be anticipated under typical operating conditions of the air vehicle. The customized layer layout may result from standard engineering analysis methods including, but not limited to, finite element analysis. In one aspect, the layers making up the wing may be arranged to produce a wing structure that possesses sufficient structural integrity while reducing the overall amount of material and resulting weight of the wing.

II. Methods of Producing a Collapsible Wing

The collapsible wing may be produced using any of the materials described herein above using any known machining or other fabricating technology appropriate for the selected material of construction. In one aspect, the material of construction may be carbon fiber epoxy composite materials, and any known production method for this material may be used to produce the collapsible wing including, but not limited to, the wet layup method. In the wet layup method, each layer of carbon fiber material is applied to a mold shaped in the desired geometry of the wing span section to be produced and the epoxy is brushed or otherwise applied to the carbon fiber material on the mold. After all layers have been situated in place, the carbon fiber material and epoxy is vacuum bagged to cure the material for a period ranging from about 24 hours to about 48 hours and to ensure that the material maintains the intended form and achieves full hardness. In an aspect, the carbon fiber material and epoxy may be cured without a vacuum bag under ambient conditions. The mold used to fabricate the wing tip section may be produced using any known method including but not limited to machining and rapid prototyping methods, and may be constructed using any appropriate known material.

In another aspect, the completed wing tip section may be used as the mold to fabricate the next wing span section adjacent to the wing tip section. The initial mold used to create the wing tip section may remain at the core in the next stages of production to ensure that subsequent sections maintain the proper shape while minimizing the chances of deformation resulting from the pressure of the vacuum during lay-up and curing. In this aspect, the direct use of the wing tip section assures tight dimensional tolerances of the fit of the wing tip section into the lumen of the adjacent wing span section. Once each wing span section is fully cured, it may be used as the mold for the next adjacent wing span section. Plastic sheeting and/or mold release compounds or similar material may be situated between adjacent wing span sections to facilitate the release of each wing span section from its underlying mold/wing span section after the wing span section is fully cured. This process may be repeated for the fabrication of all wing span sections in the collapsible wing.

The fabrication technique described in this aspect results in tightly nested wing span sections in the collapsed configuration. This fabrication technique may further enhance the structural integrity of the wing in the extended configuration, which benefits from tightly-fitting wing span sections due to the self-supporting monocoque structure of the collapsible wing. However, the fabrication technique described in this aspect may be time-intensive because each fabrication step by necessity must be conducted sequentially. For example, a collapsible wing having five wing span sections may take in excess of ten days to complete if a 48-hour curing time is assumed for each wing span section. The method in this aspect is described in further detail herein below in Example 1.

In yet another aspect, the wing span sections may be produced using a separate dedicated mold for each wing span section. In this aspect, the materials for each wing span section may be laid up and cured independently of the other wing span sections, and in one aspect all wing span sections may be laid up and cured simultaneously. The production method in this aspect may result in a reduced total fabrication time that is independent of the number of wing span sections included in the finished collapsible wing.

III. Uses of Collapsible Wing

The collapsible wing, in various aspects, is a self-supporting and light-weight structure capable of storage and transportation within a relatively small space in the collapsed configuration, as well as functioning as a robust wing structure in the extended configuration. Further, the ability of the collapsible wing to be deployed without need for tools or intricate manipulations facilitates a simple and rapid deployment of the extended wing structure that is well-suited for a variety of challenging operational environments.

Several design features of the collapsible wing render the wing amenable to use in a broad range of applications. A wide variety of wing sizes and shapes may be achieved by varying the dimensions of the wing span sections as well as the number of wing span sections. The structural integrity of the wing may be fine-tuned by varying the construction of individual wing span sections, resulting in a wing with robust structural features in those regions in which the largest structural loads are anticipated. Thus, the weight of the wing may be reduced by eliminating excess materials where they are not needed.

The collapsible wing may be incorporated into any known air vehicle; the collapsible wing may be scaled up or down in size according to the requirements of the particular air vehicle in which the wing is incorporated. The portability and simple deployment of the collapsible wing makes the wing particularly amenable to use in the design of field-deployed air vehicles included in unmanned aircraft systems. In an aspect, the collapsible wing may be used as the main wing in an air vehicle. In another aspect, the collapsible wing structure may be used as a variety of aerodynamic surfaces, including but not limited to canards, horizontal tails, vertical tails, and wings.

A. Moveable Control Surfaces

Figure 9A:
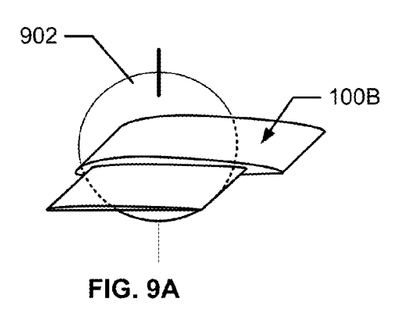
FIGS. 9A and 9B are illustrations of a movable surface including a collapsible wing in an undeflected (FIG. 9A) and deflected (FIG. 9B) positions.
Figure 9B:
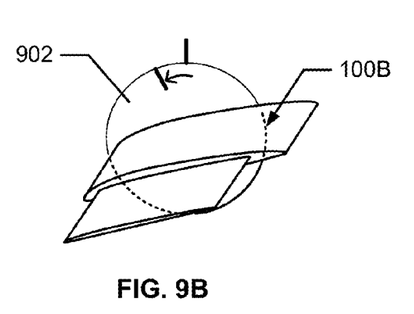

In another aspect, with suitable modification, the collapsible wing structure may be used as, or in conjunction with, a moveable control surface including but not limited to a flap, a slat, an aileron, a rudder, a moveable canard, and an elevator. In this aspect, illustrated in FIG. 9A, a collapsible wing structure 1008 may be attached to a moveable plate 902 included in the outer surface of a fuselage of an air vehicle. In the interior of the fuselage, the movable plate 902 may be operatively connected to an actuator (not shown) including but not limited to a hydraulic actuator, a servo-electrical actuator, and a stepper motor. The actuator, under active control by the operator of the air vehicle, may impart a rotational motion to the movable plate, which effects a change in incidence angle of the wing structure 1008, as shown in FIG. 8B. In other aspects, similar collapsible airfoil structures attached to movable plates may be incorporated into an UAV for use as control surfaces including, but not limited to an elevator, a rudder, or a moveable canard.

In one aspect, the collapsible wing structure may have a fixed airfoil geometry and may not incorporate moveable control surfaces. In another aspect, the collapsible wing structure may additionally integrate additional moveable controls surfaces, including, but not limited to, ailerons, slats, and flaps. In this aspect, the wing structure may incorporate modifications to the external surfaces and interior lumens of the wing span sections to provide the necessary actuators, wiring, and other elements used to effectuate the movement of the additional moveable surfaces.

B. Unmanned Aircraft System

In an aspect, the collapsible wing may be incorporated into any known air vehicle as part of an unmanned aircraft system (UAS). The air vehicle of the UAS may include a first and second collapsible wing and a fuselage. The first and second collapsible wings may be identical in design and used interchangeably as right and left wings in another aspect. Alternatively, the first and second collapsible wings may have different designs resulting in the specialized function of the first wing as a left or right wing, and the specialized function of the second wing as a right or left wing. In another aspect the UAS may include a full-span collapsible wing such as the collapsible wing illustrated in FIG. 3 and a fuselage. The collapsible wings may include an integrated attachment fitting at the inboard edge of the wing root section that reversibly engages with a corresponding receptacle integrated into the fuselage structure in one aspect. In another aspect, the attachment fitting may be integrated into the structure of the fuselage, and the corresponding receptacle may reside on the inboard edge of the wing root section. Any attachment fitting and receptacle may be incorporated into the design of the UAV. In an aspect, an attachment fitting and receptacle that do not require tools or fine manipulation to effect the engagement of the attachment fitting and receptacle may be used. Non-limiting examples of suitable attachment devices include a tabbed fitting, a cleat system, a quick release lever system, and a threaded fitting and receptacle.

In use, the UAV may be carried in a disassembled state within one or more packs carried by one or more persons. In the disassembled state, both wings are in the collapsed configuration and may be situated within protective packaging including but not limited to carrying cases or crates. The fuselage may also be situated within similar protective packaging.

To deploy the UAV, the wings may be removed from the packs and any packaging and deployed into the extended configuration as described herein above. The wings may be attached by engaging each attachment fitting of each wing with its corresponding receptacle situated on the left or right sides of the fuselage. In an aspect, if the wing is a full-span collapsible wing, the wing may be deployed in a similar matter and attached to the fuselage at the upper or lower surface by engaging the attachment fitting, which is situated at the center section of the wing, to a corresponding receptacle situated on the fuselage, depending on the design of the UAV.

After activating the engine, control system, and any sensors on board the UAV, the UAV may be hand-launched by throwing the UAV in the air at an upward angle relative to horizontal ranging from about 15 degrees to about 30 degrees or more. In other aspects, the UAV may be launched using other methods or separate devices including, but not limited to: a dedicated launcher such as a rail launcher or a catapult launcher; a slingshot; or any other suitable launch method or device known in the art.

In an aspect, the collapsible wings of the UAV lack moveable control surfaces including, but not limited to, ailerons. As a result, the UAV may accomplish all maneuvering and stabilization using moveable surfaces associated with the tail of the UAV. Non-limiting examples of suitable moveable control surfaces for the UAV include a rudder; an elevator including, but not limited to, an all-moveable horizontal tail; and a differentially movable horizontal tail. In another aspect, the UAV may use an all-moveable horizontal tail to effectuate control in the pitch axis, and a rudder to effectuate control about the yaw axis, as well as effectuate rolling maneuvers using rudder-induced sideslip combined with dihedral effect.

The UAV may be recovered by any known method including but not limited to a soft landing, a capture net and the recapture of the low-flying UAV by the user. Once recovered, the attachment fittings of the wings may be disengaged from each corresponding wing fittings on the fuselage. The detached wings may be collapsed by pushing in an inboard direction on the wing tip section or otherwise disengaging the locking mechanism. Depending on the particular locking mechanism used, a sharp tap on the wing tip section may be needed to initially disengage the locking elements of the locking mechanism. Once the wings are returned to a collapsed configuration, the wings and fuselage may be returned to the packaging and/or packs for transport and/or storage.

DEFINITIONS

The term "unmanned aircraft system" (UAS), as used herein, refers to an unmanned aircraft vehicle (UAV) and all equipment and materials associated with the operation, transport, storage, and operation of the UAV. Non-limiting examples of equipment and materials include transport crates or packs; fuels or batteries; instructions; autopilot receivers; spare parts; training simulators; and any combination thereof. In the context of this specification, the terms UAS and UAV may be used interchangeably without changing the scope or meaning of the information disclosed herein.

The term "chordwise", as used herein, refers to a direction associated with a wing span section extending from the leading edge to the trailing edge of the wing span section.

The term "spanwise", as used herein, refers to a direction associated with a wing span section extending outward from the fuselage within a horizontal plane. Spanwise may refer to a direction extending perpendicularly outward from the fuselage, or spanwise may refer to a direction extending outward from the fuselage that is parallel to the direction of a central axis of the wing.

The term "inboard" and "outboard", as used herein, refer to relative positions within a horizontal plane extending outward from the fuselage of an aircraft. Inboard refers to a position that is relatively closer to the central axis of the fuselage, and outboard refers to a position that is relatively farther away from the central axis of the fuselage.

The term "strutless", as used herein, refers to a structural design of a wing span section that does not include any significant internal structural elements, such as spars or ribs, which typically extend within the interior lumen of a wing between the upper and lower wing surface and/or between the leading edge and trailing edge of the wing.

EXAMPLES

The following example illustrates various aspects of the invention.

Example 1

Fabrication of Prototype Collapsible Wing

To demonstrate the feasibility of fabricating a collapsible wing with extendable wing sections, the following experiments were conducted. The collapsible wing fabricated in this experiment was composed of four hollow wing sections that nested inside each other in the collapsed configuration, where each wing section had a span length of about 9". In the extended position, each wing section inboard of the root section had an exposed span of about 7.5" and an overlap of approximately 1.5" between the adjacent wing sections.

The wing sections were fabricated from a carbon fiber epoxy composite material using a carbon fiber wet layup method. In this method, the sheets of carbon fiber were soaked with epoxy, and the epoxy-soaked sheets were then squeegeed to remove excess epoxy to form epoxy-impregnated carbon fiber sheets. The impregnated sheets were then wrapped around a mold in the shape of the wing span section. In order maintain tight tolerances between the wing span sections, each wing span section was fabricated successively, starting with the smallest wing span section corresponding to the wing tip and ending with the largest wing span section corresponding to the wing root. Plastic sheeting and/or mold release compound was situated between successive wing span sections to facilitate the release of the wing span sections after curing.

For the wing tip section, three layers of epoxy-impregnated sheets were laid up around a precise, rapid-prototype mold of a USNPS-4 airfoil. The three layers were arranged with the fibers of each sheet aligned in an orientation of about 0°, 45°, and 90° relative to the spanwise direction of the section, respectively, as described previously herein. Multiple layers of peel ply, a porous fabric, were situated over the layers of the wing tip section to cover the carbon fiber and soak up any excess epoxy during the vacuum curing process, thereby reducing any excess epoxy from the layers of material.

Figure 10:
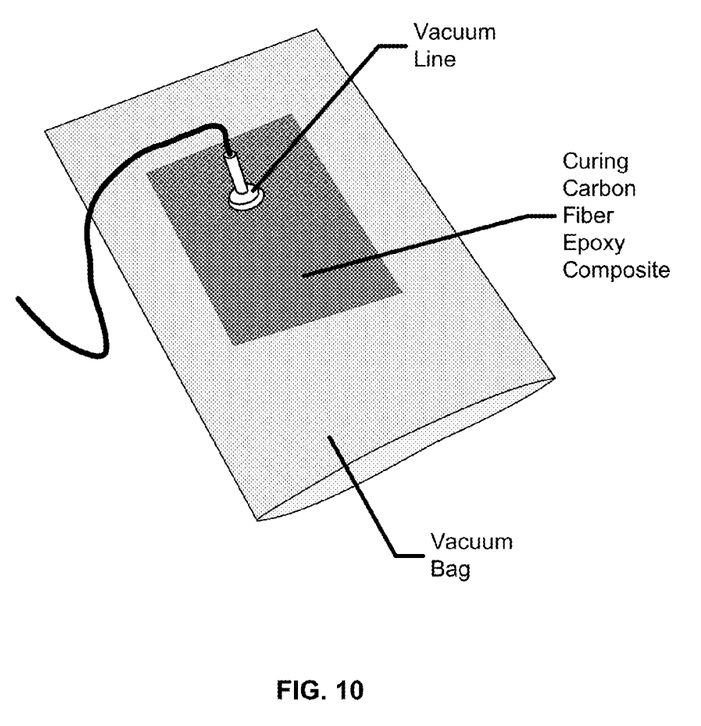
FIG. 10 is a photograph of the wing tip section during a vacuum curing process after carbon fiber lay up.

To cure the wing tip section, a vacuum bag was sealed around the wrapped mold as shown in FIG. 10, and the wing tip section was cured under vacuum for about 24 to about 48 hours. After completion of curing of the wing tip section, the cured wing tip section was kept on the underlying mold, and was further trimmed and sanded to provide a suitable surface for the lay-up of the subsequent wing span section.

The subsequent wing span section, to be located adjacent to the wing tip section in the finished collapsible wing, was fabricated using a series of steps similar to those used for the fabrication of the wing tip section. Three layers of epoxy-impregnated carbon fiber sheets were laid up around the cured wing tip section, as described previously, and cured for about 24 to about 48 hours in the vacuum-sealed plastic bag as described previously. This process was repeated for each successively wing span section, using the cured, trimmed and sanded adjacent wing section as the mold for the laid-up carbon fiber sheets.

In this manner, each wing span section was laid up around the immediately adjacent wing span section ensuring that each wing span section fit precisely inside its larger adjacent wing span section. The entire collapsible wing was fabricated in a total time of about eight days; about 48 hours were expended for the fabrication of each of the four wing sections.

Figure 11:
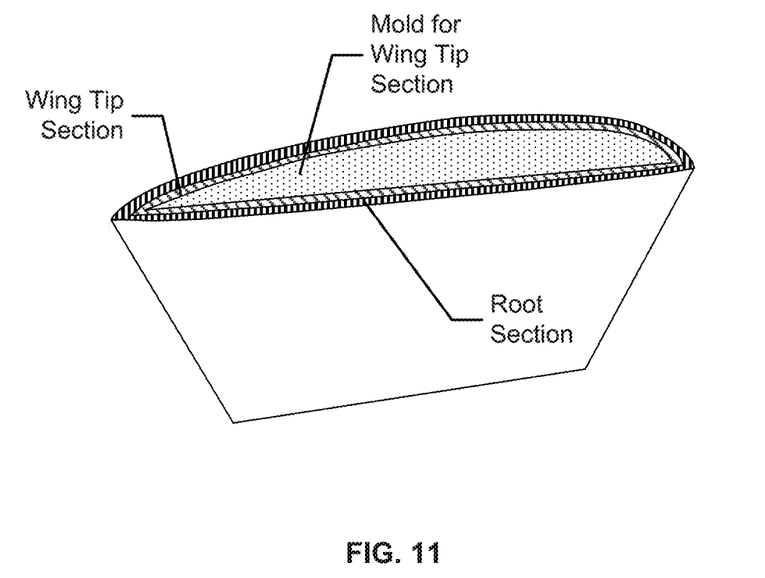
FIG. 11 is a photograph of the cured wing span sections before separation.
Figure 12:
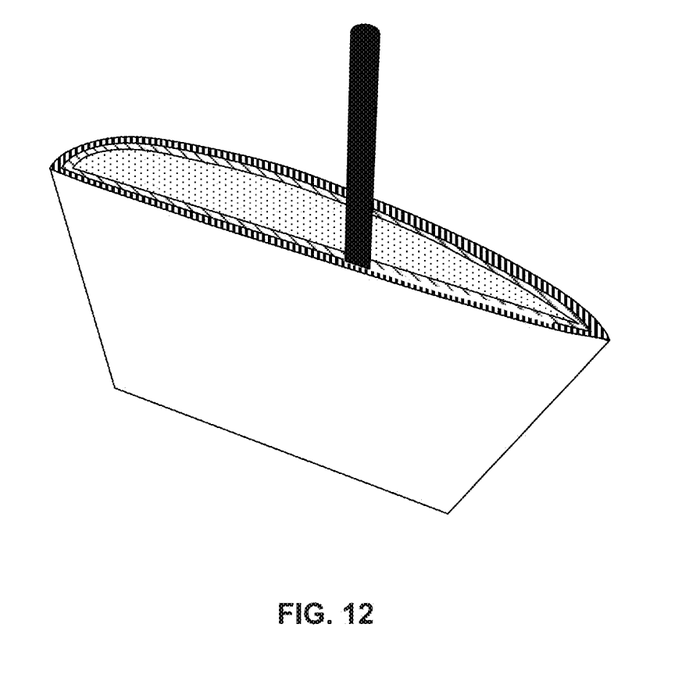
FIG. 12 is a photograph showing the separation of cured wing sections from the wing tip mold and adjacent wing span sections.
Figure 13:
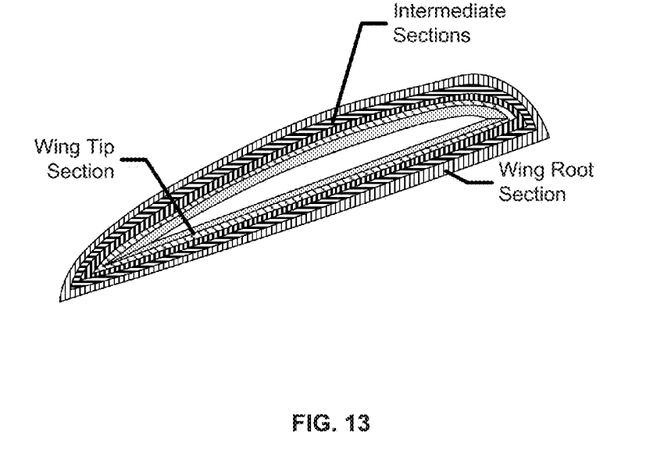
FIG. 13 is a photograph of a prototype collapsible wing in a collapsed position.
Figure 14:
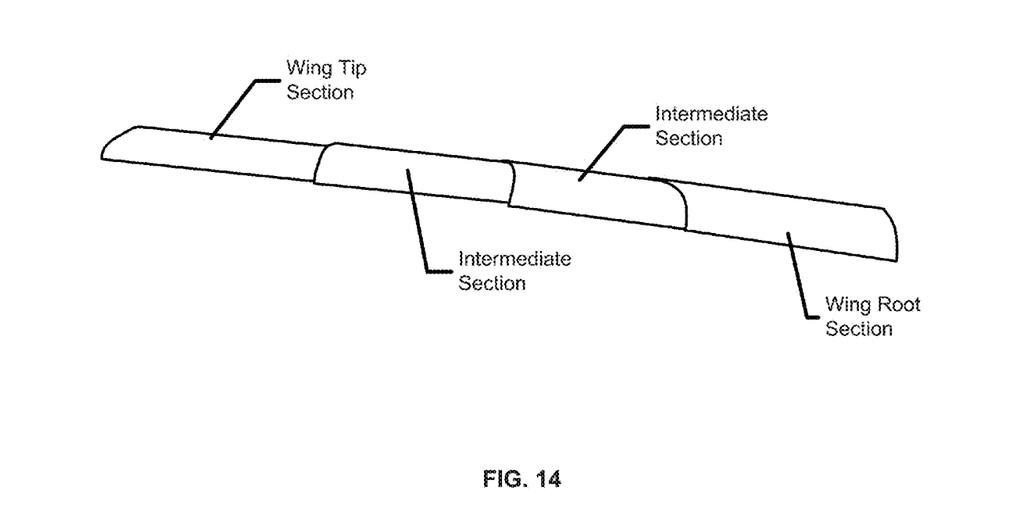
FIG. 14 is a photograph showing a prototype collapsible wing in an extended position.

The resulting cured wing span sections are shown in FIG. 11 prior to separating each cured wing span section from its underlying adjacent wing span section acting as a mold. The process of separating the wing span sections from each other is shown in FIG. 12. After the wing span sections were separated and the initial wing tip mold removed, the resulting four wing span sections nested inside each other in a collapsed configuration, as shown in FIG. 13. A photograph of the prototype collapsible wing produced in this experiment is shown in FIG. 14 in the extended position. The completed collapsible wing shown in FIG. 14 weighed about 1.35 lbs.

The results of this experiment demonstrated the feasibility of the fabrication of a collapsible wing using a carbon fiber wet layup method.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A collapsible wing for an unmanned aircraft system, the wing comprising at least two monocoque wing sections comprising a wing root section, a wing span section, a wing tip section, and a wing tip end plate or a winglet attached to the wing tip section, wherein:
   the wing is configured to deploy between a collapsed configuration and an extended configuration;
   the wing span section nests within a lumen of the wing root section and the wing tip section nests within a lumen of the wing span section in the collapsed configuration;
   at least a portion of the wing span section protrudes from within the lumen of the wing root section and at least a portion of the wing tip section protrudes from within the lumen of the wing span section in the extended configuration; and
   the wing tip section further comprises a connector and the wing tip end plate or the winglet further comprises a mating connector, wherein:
      the wing tip end plate or the winglet is removed from the wing tip section when the wing is in the collapsed configuration; and
      the wing tip end plate or the winglet is attached to the wing tip section by mating the connector and the mating connector when the wing is in the extended configuration.

2. The collapsible wing according to claim 1, wherein the wing tip section further comprises a grip to facilitate the deployment of the wing, the grip chosen from any one or more of: a strap, a handle, an indented lip, or a gripping structure to facilitate the deployment and collapsing of the wing.

3. The collapsible wing according to claim 1, further comprising one or more movable control surfaces, wherein the one or more movable control surfaces consists of an aileron, a flap, or a flap and an aileron.

4. The collapsible wing according to claim 3, wherein any one or more of the at least two wing sections integrates each of the one or more movable control surfaces.

5. The collapsible wing according to claim 3, wherein each movable control surface further comprises a connector and each corresponding wing section further comprises a mating connector, wherein:
- each movable control surface is removed from the corresponding wing section when the wing is in the collapsed configuration; and
- each movable control surface is attached to the corresponding wing section by mating the connector and the mating connector when the wing is in the extended configuration.

6. The collapsible wing according to claim 3, further comprising one or more actuators situated within any one or more of the at least two wing sections, wherein the one or more actuators effectuate movement of the one or more movable control surfaces.

7. The collapsible wing according to claim 6, further comprising at least one additional transmissive element chosen from one or more of: electrical wires, cables, or optical fibers, the at least one additional transmissive element situated within any one or more of the at least two wing sections to transmit any one or more of power, control command signals, sensor signals, and any combination thereof.

8. A collapsible wing for an unmanned aircraft system, the wing comprising at least two monocoque wing sections comprising a wing root section, and a wing span section, wherein:
- the wing is configured to deploy between a collapsed configuration and an extended configuration;
- the wing span section nests within a lumen of the wing root section in the collapsed configuration;
- at least a portion of the wing span section protrudes from within the lumen of the wing root section in the extended configuration; and
- each wing section comprises a taper comprising an outboard chord length at an outboard edge of the wing section shorter than an inboard chord length at an inboard edge of the wing section.

9. The collapsible wing according to claim 8, wherein the taper of each wing section mechanically limits the protrusion of each wing section to prevent separation of adjacent wing sections during deployment to the extended configuration.

10. The collapsible wing according to claim 8, further comprising one or more movable control surfaces, wherein the one or more movable control surfaces consists of an aileron, a flap, or a flap and an aileron.

11. The collapsible wing according to claim 10, wherein any one or more of the at least two wing sections integrates each of the one or more movable control surfaces.

12. The collapsible wing according to claim 10, wherein each movable control surface further comprises a connector and each corresponding wing section further comprises a mating connector, wherein:
- each movable control surface is removed from the corresponding wing section when the wing is in the collapsed configuration; and
- each movable control surface is attached to the corresponding wing section by mating the connector and the mating connector when the wing is in the extended configuration.

13. The collapsible wing according to claim 10, further comprising one or more actuators situated within any one or more of the at least two wing sections, wherein the one or more actuators effectuate movement of the one or more movable control surfaces.

14. The collapsible wing according to claim 10, further comprising at least one additional transmissive element chosen from one or more of: electrical wires, cables, or optical fibers, the at least one additional transmissive element situated within any one or more of the at least two wing sections to transmit any one or more of power, control command signals, sensor signals, and any combination thereof.

15. A collapsible wing for an unmanned aircraft system, the wing comprising at least two monocoque wing sections comprising a wing root section, and a wing span section, wherein:
- the wing is configured to deploy between a collapsed configuration and an extended configuration;
- the wing span section nests within a lumen of the wing root section in the collapsed configuration;
- at least a portion of the wing span section protrudes from within the lumen of the wing root section in the extended configuration;
- the wing further comprises at least one overlap region when the wing is in the extended configuration, each overlap region comprising a nested portion of a protruding wing section remaining within the lumen of an adjacent wing section with a degree of overlap comprising a separation distance between the inboard edge of the protruding wing section and the outboard edge of the adjacent wing section; and
- a first degree of overlap between the wing root section and the protruding wing span section is larger than a second degree of overlap between the wing span section and the protruding wing tip section.

16. The collapsible wing according to claim 15, further comprising one or more movable control surfaces, wherein:
- the one or more movable control surfaces consist of an aileron, a flap, or a flap and an aileron; and
- any one or more of the at least two wing sections integrates each of the one or more movable control surfaces.

17. The collapsible wing according to claim 16, further comprising:
- one or more actuators situated within any one or more of the at least two wing sections, wherein the one or more actuators effectuate movement of the one or more movable control surfaces; and
- at least one additional transmissive element chosen from one or more of: electrical wires, cables, or optical fibers, the at least one additional transmissive element situated within any one or more of the at least two wing sections to transmit any one or more of power, control command signals, sensor signals, and any combination thereof.

18. A collapsible wing for an unmanned aircraft system, the wing comprising at least two monocoque wing sections comprising a wing root section, and a wing span section, wherein:
- the wing is configured to deploy between a collapsed configuration and an extended configuration;
- the wing span section nests within a lumen of the wing root section in the collapsed configuration;

at least a portion of the wing span section protrudes from within the lumen of the wing root section in the extended configuration; and each outboard edge of each wing section further comprises an outboard edge profile forming a gradual transition in thickness from an exposed surface of the protruding wing section to an exposed surface of the adjacent wing section, the outboard edge profile comprising: a flat ramp, a rounded corner, a series of smaller steps, and any combination thereof.

19. The collapsible wing according to claim 18, further comprising one or more movable control surfaces, wherein:

the one or more movable control surfaces consist of an aileron, a flap, or a flap and an aileron; and any one or more of the at least two wing sections integrates each of the one or more movable control surfaces.

20. The collapsible wing according to claim 19, further comprising:

one or more actuators situated within any one or more of the at least two wing sections, wherein the one or more actuators effectuate movement of the one or more movable control surfaces; and at least one additional transmissive element chosen from one or more of: electrical wires, cables, or optical fibers, the at least one additional transmissive element situated within any one or more of the at least two wing sections to transmit any one or more of power, control command signals, sensor signals, and any combination thereof.

21. The collapsible wing according to claim 20, wherein each movable control surface further comprises a connector and each corresponding wing section further comprises a mating connector, wherein:

each movable control surface is removed from the corresponding wing section when the wing is in the collapsed configuration; and each movable control surface is attached to the corresponding wing section by mating the connector and the mating connector when the wing is in the extended configuration.

22. A collapsible wing for an unmanned aircraft system, the wing comprising at least two monocoque wing sections comprising a wing root section, and a wing span section, wherein:

the wing is configured to deploy between a collapsed configuration and an extended configuration;

the wing span section nests within a lumen of the wing root section in the collapsed configuration;

at least a portion of the wing span section protrudes from within the lumen of the wing root section in the extended configuration; and the wing further comprises a covering situated over the at least two wing sections in the extended configuration, wherein the covering forms a smooth, seamless wing surface.

23. The collapsible wing according to claim 22, further comprising one or more movable control surfaces, wherein:

the one or more movable control surfaces consist of an aileron, a flap, or a flap and an aileron; and any one or more of the at least two wing sections integrates each of the one or more movable control surfaces.

24. The collapsible wing according to claim 23, further comprising:

one or more actuators situated within any one or more of the at least two wing sections, wherein the one or more actuators effectuate movement of the one or more movable control surfaces; and at least one additional transmissive element chosen from one or more of: electrical wires, cables, or optical fibers, the at least one additional transmissive element situated within any one or more of the at least two wing sections to transmit any one or more of power, control command signals, sensor signals, and any combination thereof.

* * * * *